(No Model.) 3 Sheets—Sheet 1.

G. H. ROATH.
CULTIVATOR.

No. 267,255. Patented Nov. 7, 1882.

Witnesses
Alexander Harris

Inventor
Geo. H. Roath
by Wm. R. Gerhart
Attorney (No Model.)
3 Sheets—Sheet 2.
G. H. ROATH.
CULTIVATOR.
No. 267,255.
Patented Nov. 7, 1882.
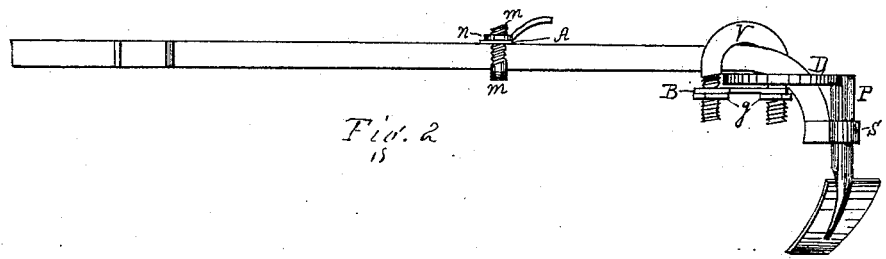
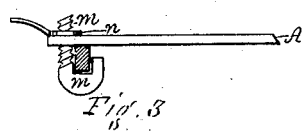
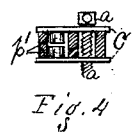
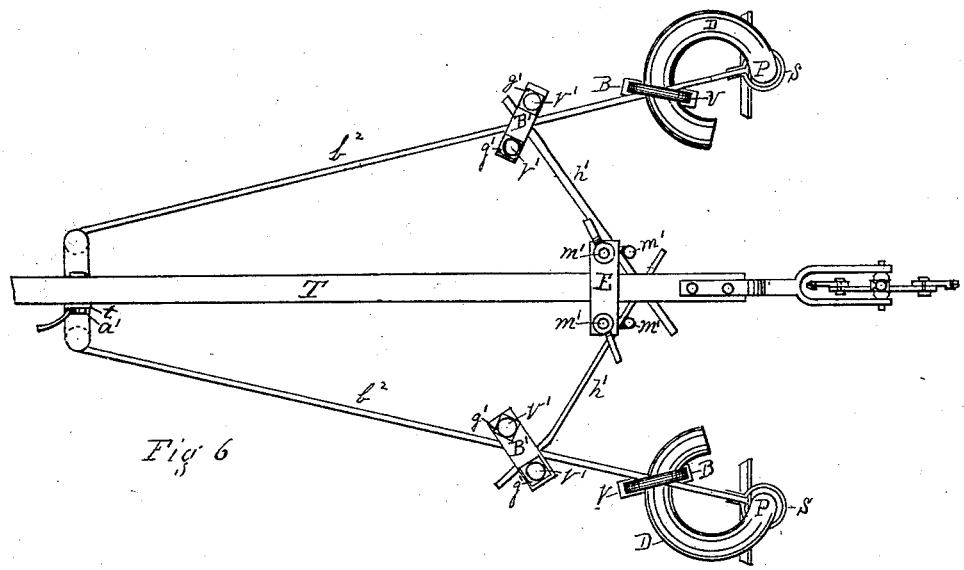
Witnesses
Alexander Harris
Inventor
Geo. H. Roath (No Model.) 3 Sheets—Sheet 3.

G. H. ROATH.
CULTIVATOR.

No. 267,255. Patented Nov. 7, 1882.

Witnesses
Alexander Harris
Jno. B. Cochran

Inventor
Geo. H. Roath
per Wm. R. Gerhart
Attorney

UNITED STATES PATENT OFFICE.

GEORGE H. ROATH, OF MARIETTA, PENNSYLVANIA.

CULTIVATOR.

SPECIFICATION forming part of Letters Patent No. 267,255, dated November 7, 1882.

Application filed September 29, 1881. (No model.)

*To all whom it may concern:*

Be it known that I, GEORGE H. ROATH, a citizen of the United States, residing at Marietta, in the county of Lancaster and State of Pennsylvania, have invented a new and useful Cultivator, of which the following is a specification.

My invention relates to improvements in that class of cultivators with which various kinds of work can be done by changing the relative position or detaching some of the beams; and the objects of my improvements are, first, to regulate the beams so that their relative positions, as also those of the shovels attached to them, may be changed; and, second, a device by means of which the shovels can be set at a vertical angle, in order to scrape weeds from or cultivate the sides of a row. I attain these objects by the mechanism illustrated in the accompanying drawings, in which—

Figure 1:
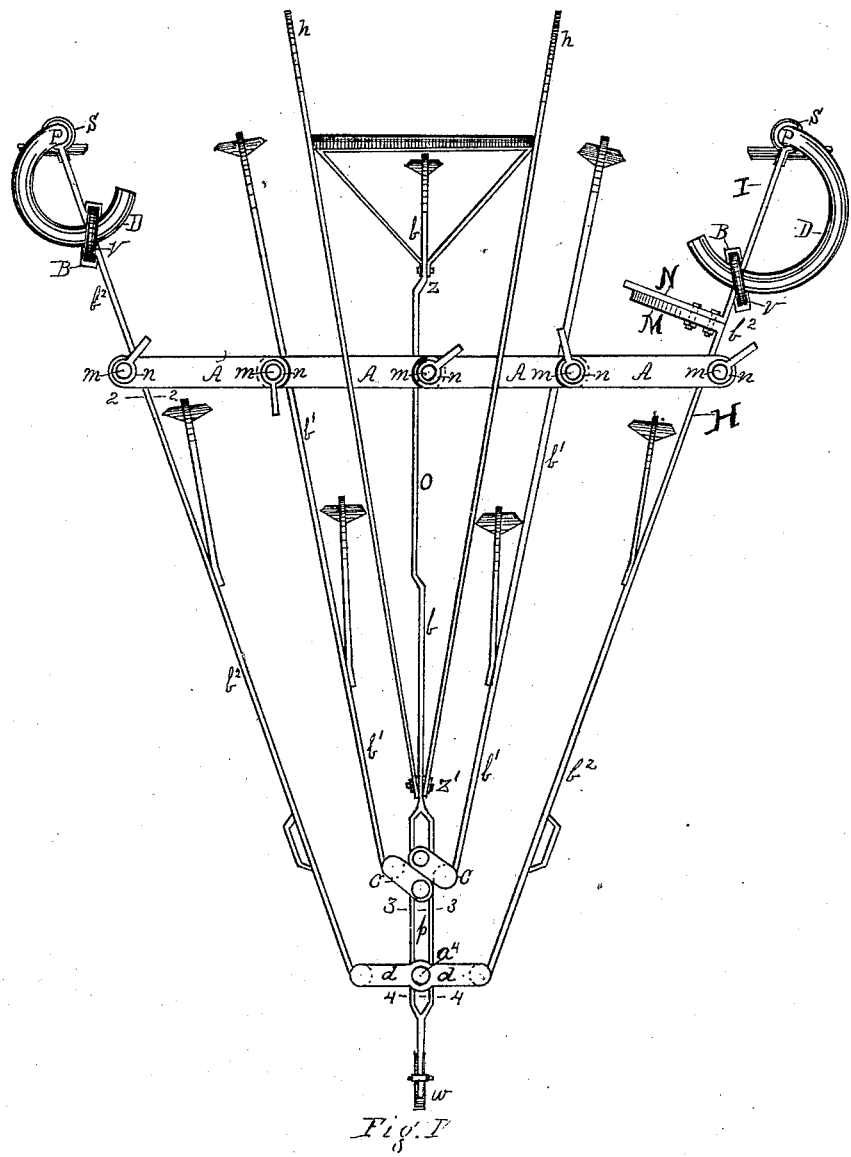
Figure 7:
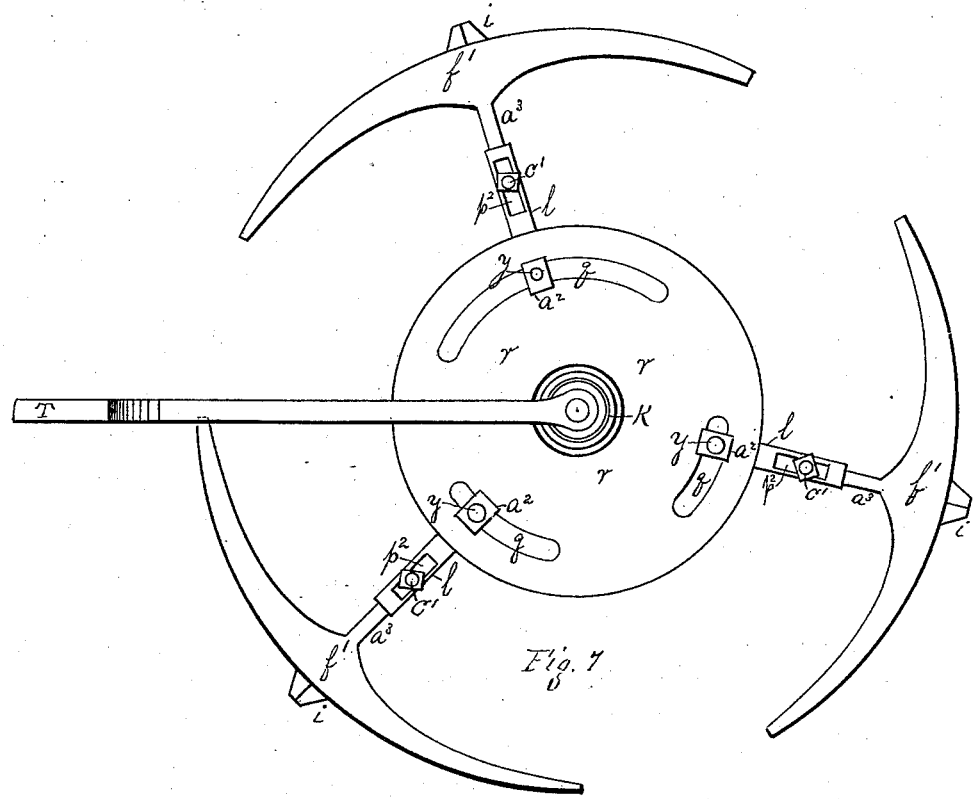
Figure 9:
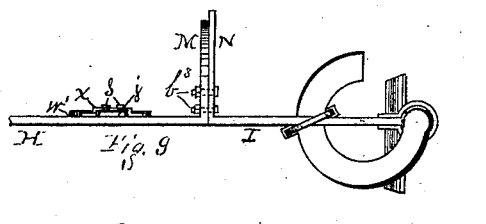
Figure 8:
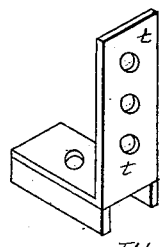
Figure 11:
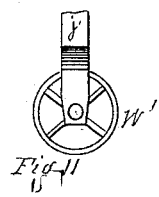
Figure 10:
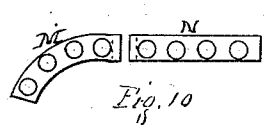

Figure 1 is a top view of the cultivator as arranged to be worked by two horses; Fig. 2, a side view of one of the outer beams, showing the arrangement of the reversible post. Fig. 3 is a section through line 2 2 of Fig. 1, showing the arrangement of the bolt-hooks for connecting the slide-bars with the beams. Fig. 4 is a section through line 3 3 of Fig. 1, showing the double clamp connecting the interior beams with that in the center. Fig. 5 is a section through line 4 4 of Fig. 1, showing the double clamp connecting the outer beams with the one in the center. Fig. 6 is a top view of the ridger and marker. Fig. 7 is a side view of the marker. Fig. 8 is a perspective view of the vertical plate securing the outer beams to the tongue of the ridger and marker. Fig. 9 is a top sectional view of the divided beam and means for setting the shovel at a vertical angle. Fig. 10 is a view of the faces of the plates by which the two sections of the beam are connected, and Fig. 11 is a side view of the wheel supporting the front section.

Similar letters refer to similar parts throughout the several views.

The following is a description of the cultivator as arranged to be worked by two horses.

The central beam, $b$, to which are attached a front wheel, $w$, and the handles $h$, has a long slot or pocket, $p$, in front of the handles, and an offset, O, between the two points Z and Z' at which said handles are attached. The front end of each of the two interior beams, $b'$ $b'$, is fastened to the central beam, $b$, by means of a shifting double clamp, $c$. These clamps are composed of two plates, each of which has a center point or teat, $p'$, projecting from the inner surface at one end, and a bolt-hole cut through the other end, the bolt-hole through the lower plate having a thread cut therein. In connecting the beams by means of the clamp the two plates embrace the end of beam $b'$ and the pocket $p$ in beam $b$, one plate being above and the other below. The center points, $p'$, are received by a vertical circular opening through the end of beam $b'$, and a capstan-headed screw-bolt, $a$, is passed through the bolt-holes in the plates and the pocket $p$, securing the clamp to and tightening or loosening the grip of the plates upon the beams. The width of the pocket $p$ is the same as the diameter of the bolt $a$, preventing any lateral play of the bolt in the pocket. When it is wished to change the distance between the points of connection of the ends of beams $b'$ and the beam $b$, the bolt of one or both clamps is loosened and the clamp moved to the desired point, when the bolt is again tightened. When the point of connection of the clamp in front is to be moved back of the other, or vice versa, the bolt is removed, the clamp is freed from the beam, and the connection again made wherever wished.

The center points, $p'$, with the vertical opening through the front ends of beams $b'$, act as hinges for the said beams $b'$ and allow the distance between their outer ends and that of the central beam, $b$, to be regulated. This mode of connection, together with the slide-bars yet to be described, permits the "staggering" of the shovels in any possible manner desired. The outer beams, $b^2$ $b^2$, are also secured to the central beam by means of a shifting double clamp, $d$, formed of two plates, as described of the clamp $c$; but in this case both beams are held by one clamp, the plates of which extend across the center beam, $b$, and have center points at both ends, and bolt-holes through the center, through which and the pocket the screw-bolt passes and secures them to the said beam $b$. As in the case of the interior beams, $b'$ $b'$, these outer beams are hinged by the center points, so as to be opened or closed upon the interior beams; but the clamp itself is always held at right angles with the center beam by means of a stay-block, e, on the upper surface of the lower plate, f, of the clamp, which fits into the pocket. There is a pocket on the outside of each of these beams for attaching additional beams, if necessary. In the clamps for holding the beams $b' b'$ and $b^2 b^2$ the removal of the screw-bolt frees the clamp from the beams.

At the offset O is arranged a series of slide-bars, A A, secured to the beams by bolt-hooks $m$ passing through openings in their ends. There is a separate bar between and above each two beams. The ends of those meeting at the central and inner beams lap each other, and are secured to the beams beneath by the same bolt-hooks. The lower ends of the bolt-hooks $m$ embrace the under sides of the beams, and the upper ends form a screw, about which and above the bars works a nut, $n$, with a handle attached. The screw of the bolt holding the ends of the bars which meet at the center beam is placed on the inside of the offset O in order to have the point of intersection in a line with the center of the beam. The screws of the others are placed on the outside of the beams. The object of these bars is to increase or lessen the distance between any two or all of the beams and hold them securely in any position, and is done by loosening the nuts $n$ and sliding the hooks, with the ends of the bars they hold, back or forth along the beams. When arranged as desired the nuts are again tightened.

The post P, to the lower end of which a shovel is attached, revolves in a socket, S, fastened to such part of the beam as may be necessary. Attached to the upper end of said post is a circular horizontal arm, D, the top of which is on the same plane with the bottom surface of the beam under which it works. This arm is held in place by a U-shaped screw-bolt, V, and a clamp-plate, B, the former being put in position with the ends downward, and embracing the beam and circular arm, and the latter is placed against the horizontal arm and held firmly by nuts $g$. When the position of the shovel is to be changed the nuts are loosened, (the circular arm being thus allowed to revolve freely,) and the post can then be turned so as to set the shovel as may be wished. The post is then secured in its new position by screwing up the nuts until the plate B again holds the arm firmly against the bottom of the beam.

In order to have a ridger and marker, the outer beams, $b^2 b^2$, are freed from the central beam and attached to a tongue, T, by means of a vertical plate, $t$. This plate has an elbow at its lower end extending under the tongue, which is channeled beneath to fit on the upper plate of the clamp of the beams, to which it is firmly secured by a screw-bolt. The vertical plate $t$ has openings at regular distances throughout its length, any one of which may receive the screw-bolt $a'$, connecting it with the tongue T. The different openings permit the distance between the tongue and the clamp to be regulated. Some distance back from the ends of the beams the same are again connected with the tongue by arms $h'$, held to said beams by U-shaped screw-bolts V', and to the tongue by bolt-hooks $m'$, as before described; but the U-shaped bolts have their ends turned upward, with the clamp-plate B' held by nuts $g'$ on top of the beams, and the arm $h'$ held in the yoke against the bottom of the beam. The bolt-hooks $m'$ pass through the ends of a plate, E, which rests across the top of the tongue, and the ends of the arms pass under the tongue and are each embraced by one of the hooks. The tightening of the nuts holds both the plate E and the arms $h'$ firmly to the tongue. The marker is attached to the rear end of the tongue, which extends sufficiently far back to enable said marker to work behind the shovels of the beams. The marker is arranged as shown in Fig. 7. The rim $r$ of the hub $k$ has three slots or openings, $q$, cut through it, the direction of which is parallel with the circumference of the rim. The spokes of the marker are arranged as follows: Slide-bars $l$, which have long slots $p^2$ cut through them lengthwise at the outer ends, are secured in the slots $q$ by means of set-screws $y$, attached to their inner ends, which screws are held by nuts $a^2$. These slots in the rim $r$ are of such length that either three or four slide-bars can be attached, and at the same time be set at equal distances apart. There are arms $a^3$ secured in the slots $p^2$ of the slide-bars (and projecting beyond their ends) by means of a set-screw and nut, $c'$, similar to that securing the slide-bar. These arms have segments $f'$ at their outer ends, from the periphery of which the tooth $i$ of the marker projects. The object of this arrangement of the slide-bars and arms of the spokes is to regulate, as may be desired, the distance between the marks made by the teeth $i\,i$, and that of the shovels and marker is to first throw up a ridge, and then designate the points for planting.

When the two outer beams, $b^2 b^2$, Fig. 1, are removed from the machine the remaining beams constitute a one-horse cultivator.

In the device for setting the shovel at a vertical angle for scraping the side of a row the outer beam is divided into two sections, H I, Figs. 1 and 9, at a point a short distance in front of the shovel. From the sides, and at the point of division of the two sections, an arm projects from each, the one, M, curving downward at a short distance from the beam, the other, N, being horizontal. Both arms are perforated with bolt-holes, Fig. 10, the two nearest the beam in the curved arm M being in a line parallel with those in the horizontal arm N. When the shovel is worked in a horizontal position the arms mentioned are secured by bolts $b^3$ through the two holes nearest the beam; and when it is desirable to set the shovel at an angle the outer bolt is removed, the arm N depressed, and the bolt fastened through an opening in it and a corresponding one in the curved arm M. Somewhat forward of the point of intersection the section H is supported by a wheel, $w'$, the arm $j$, holding the axle, of which is secured in the socket $x$ of the section by means of screws $s$. This sectional beam can be used as an alternate device for beams $b'$ or $b^2$; or, if preferable, the said beams $b'$ and $b^2$ can be made of the sectional form.

What I claim as my invention, and desire to secure by Letters Patent, is—

1. In a cultivator, the combination, with the central beam, $b$, having the elongated slot $p$, of the shifting clamps $c\ c$, having center points or teats, $p'$, the beams $b'\ b'$, and rear connecting or slide bars, substantially as described.

2. A cultivator-beam divided into two sections, H and I, with their respective arms M and N fastened together by bolts $b^3$, substantially as and for the purpose specified.

GEORGE H. ROATH

Witnesses:
J. Z. LINDEMUTH,
E. D. ROATH.